(12) United States Patent
Maier

(10) Patent No.: US 6,325,454 B1
(45) Date of Patent: Dec. 4, 2001

(54) CHILD SAFETY SEAT

(75) Inventor: Dieter Maier, Giengen/Brenz (DE)

(73) Assignee: Britax Romer Kindersicherheit GmbH, Ulm (DE)

( * ) Notice: Subject to any disclaimer, the term of this patent is extended or adjusted under 35 U.S.C. 154(b) by 0 days.

(21) Appl. No.: 09/678,004

(22) Filed: Oct. 3, 2000

(30) Foreign Application Priority Data

Oct. 9, 1999 (GB) .................................................. 9923868

(51) Int. Cl.[7] .................................................. A47C 1/08
(52) U.S. Cl. .................................................. 297/253
(58) Field of Search .............................. 297/250.1, 253, 297/216.1, 216.11, 216.16, 216.19

(56) References Cited

U.S. PATENT DOCUMENTS 3,262,736 * 7/1966 Merelis .
5,487,588 * 1/1996 Burleigh et al. .
5,816,651 * 10/1998 Feuerherdt .
6,082,819    7/2000 Jackson .

* cited by examiner

Primary Examiner—Milton Nelson, Jr.
(74) Attorney, Agent, or Firm—Davis & Bujold, P.L.L.C.

(57) ABSTRACT

A child safety seat comprises a child seat structure having a base support surface for resting on a vehicle seat cushion and a back support surface for abutting against the seat back of the vehicle seat. A rigid link is pivotally attached to the child seat structure so as to project from the child seat structure between the base support surface and the back support surface. A releasable connector is mounted on the rigid link for engagement with a standard anchorage unit associated with the vehicle seat. In the event of sudden deceleration, both the front and rear edges of the base support surface are pressed downwards into the vehicle seat cushion simultaneously. This results in a reduction of the extend of forward excursion of the child's head.

8 Claims, 3 Drawing Sheets

CHILD SAFETY SEAT

FIELD

This invention relates to a child safety seat for use in a vehicle.

RELATED ART

It is well known for a child safety seat to rest on a vehicle seat and to be secured thereon by the corresponding vehicle seat belt. The disadvantage of this arrangement is that, even if the vehicle seat belt is pulled very tight during installation, the resilience of the belt, will permit undesirable movement of the child seat relative to the vehicle in the event of sudden deceleration, for example, during an accident. In order to overcome this disadvantage, it has been proposed to provide vehicle seats with standard anchorage units at agreed locations for engagement by releasable connectors which are attached to the child seat structure by rigid links. Such anchorage units will be referred to hereinafter as "standard anchorage units".

The invention relates to a child safety seat of the type comprising a child seat structure having a base support surface for resting on a vehicle seat cushion, a back support surface for abutting against the seat back of said vehicle seat, a seating surface for a child occupant, and a rigid link projecting from the child seat structure between the base support surface and the back support surface, and a releasable connector mounted on the rigid link for engagement with a standard anchorage unit associated with the vehicle seat.

U.S. Pat. No. 6,082,819 discloses such a child safety seat for use with two standard anchorage units located near the rear edge of the vehicle seat cushion and the bottom of the vehicle seat back. This arrangement is subject to the disadvantage that, in the event of an accident, the child seat tends to rotate about the standard anchorage units, compressing the front part of the vehicle seat cushion and allowing undesirable forward movement of the head of a child occupant of the child seat. The present invention aims to provide a child safety seat in which this disadvantage is mitigated.

SUMMARY OF THE INVENTION

According to the invention, in a child safety seat of the type described above, the rigid link is pivotally attached to the child seat structure.

Preferably the rigid link is pivotally attached to the child seat structure at a pivot location above the base support surface.

In the event of sudden deceleration, operation of this arrangement differs from the prior art in that the centre of gravity of the combination of the child seat structure and the seat occupant does not rotate about the standard anchorage units at a constant radius. Instead both the front and rear edges of the base support surface are pressed downwards into the vehicle seat cushion simultaneously. This results in a reduction in the distance of this centre of gravity from the anchorage units and therefore a corresponding reduction in the rotational moment exerted by the inertia of the child seat. The overall result is a reduction of the extend of forward excursion of the child's head.

Preferably, each rigid link is L-shaped with a first limb carrying the corresponding connector and a second limb having its free end pivotally attached to the child seat structure. In normal use, the first limb lies in a rearward continuation of the plane of the base support surface and the second limb is generally parallel to the back support surface.

The height of the pivot location above the base surface is at least 30 mm so as to be greater than the reduction of the thickness of the vehicle seat cushion when it is fully compressed.

DETAILED DESCRIPTION OF THE PREFERRED EMBODIMENT

Figure 1:
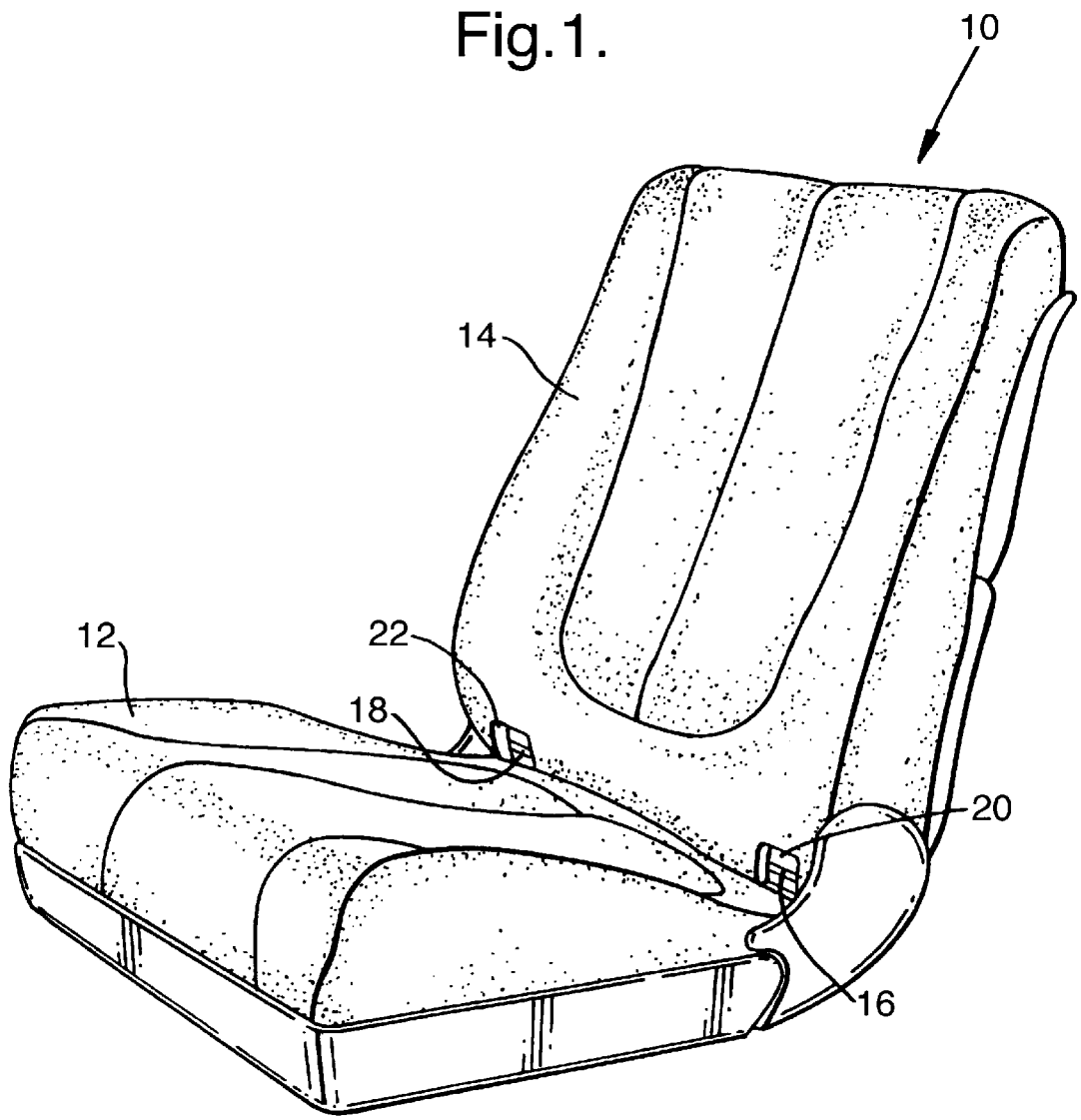
FIG. 1 is a perspective view of a vehicle seat equipped with standard anchorage units.

FIG. 1 shows a vehicle seat 10 equipped with two standard anchorage units according to the first proposal. The seat 10 comprises a seat cushion 12 and a backrest 14. The two standard anchorage units comprise transversely extending rods 16 and 18 which are accessible through openings 20 and 22 in the bottom of the backrest and which are rigidly secured to the frame (not shown) of the seat 10.

Figure 2:
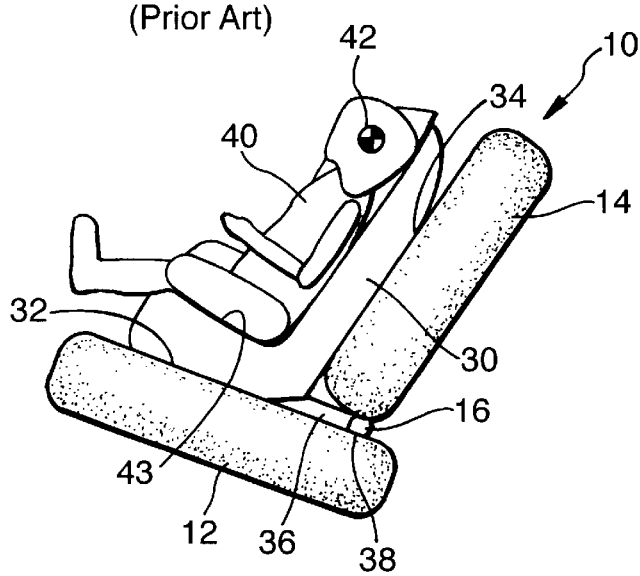
FIG. 2 is a schematic side view of a known child seat installed on the vehicle seat shown in FIG. 1 with a test dummy on the child seat.

FIG. 2 shows a known child seat 30 having a base support surface 32 resting on the seat cushion 12 of the vehicle seat 10 and a back support surface 34 abutting against the backrest 14. A rigid link 36 projects from the junction between the base support surface 32 and the back support surface 34 and is rigidly secured to the child seat 30 so as to be fixed parallel with the base support surface 32. A releasable connector 38 engages with the standard anchorage unit 16. A similar releasable connector (not shown), on another rigid link, engages with the other standard anchorage unit 18. The releasable connectors may be as described in U.S. Pat. No. 6,082,819.

The seat is occupied by a test dummy 40 having a reference marking 42 on the side of its head. The dummy 40 is retained on a seating surface 43 of the child seat 30 by a conventional harness (not shown).

Figure 3:
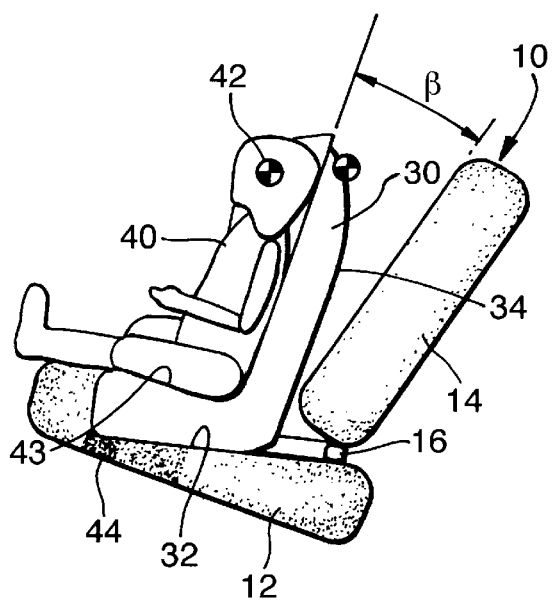
FIG. 3 is a side view similar to FIG. 2 showing the child seat and dummy in an initial phase of movement after sudden deceleration of the vehicle.
Figure 4:
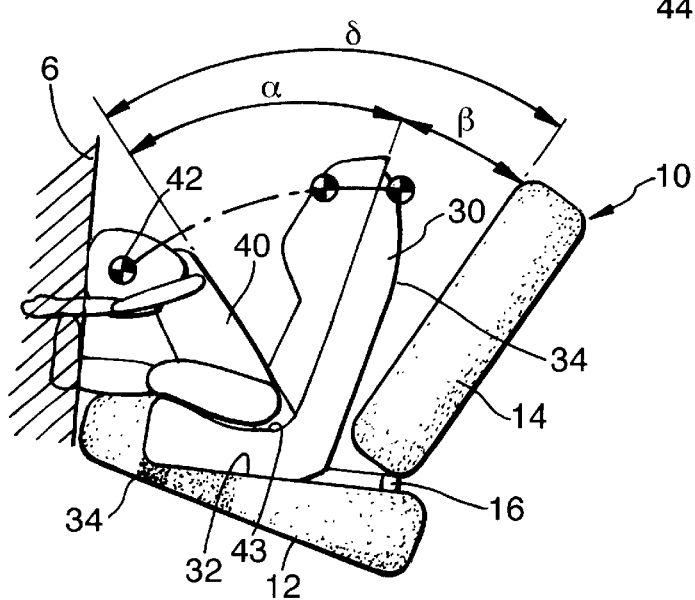
FIG. 4 is a schematic side view, similar to FIGS. 2 and 3 after a second phase of deceleration.

If the vehicle seat 10 is subject to sudden deceleration in the normal direction of travel, the child seat 30 tends to pivot in the counter-clockwise direction (as viewed in FIGS. 2 to 4) about the standard anchorage units 16 and 18. This results in compression of the part 44 of the vehicle seat cushion 12 which is under the front edge of the base surface 32 and pivotal movement of the child seat 30 through an angle β as shown in FIG. 3. During the next phase of movement, the torso of the dummy 40 pivots about its pelvis through an angle a as shown in FIG. 4, resulting in a total forward movement through an angle 6 (equal to α+β). This movement allows the head of the dummy to come into contact with a reference surface 46 positioned in front of the vehicle seat 10, thus exceeding the extent of undesirable forward movement.

Figure 5:
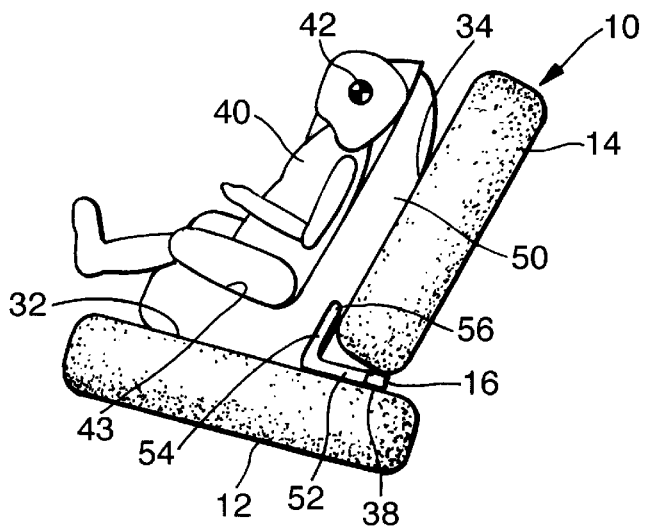
FIGS. 5, 6 and 7 are side views, similar to FIGS. 2, 3 and 4 respectively showing a child seat in accordance with the invention on the vehicle seat shown in FIG. 1.

FIG. 5 shows a child seat 50 in accordance with the invention, having support surfaces 32 and 34 similar to the correspondingly numbered support surfaces of the child seat 40. However, the releasable connector 38, which engages with the standard anchorage unit 16 is mounted on the end of one limb 52 of an L-shaped link, the other limb 54 of which has its free end attached by a pivot connection 56 to the child seat 50 at a location adjacent to the back support surface 34 above the base support surface 32 at a distance equal to the length of the limb 54. A similar link (not shown) is provided for the connector which engages with the other standard anchorage unit 18.

Figure 6:
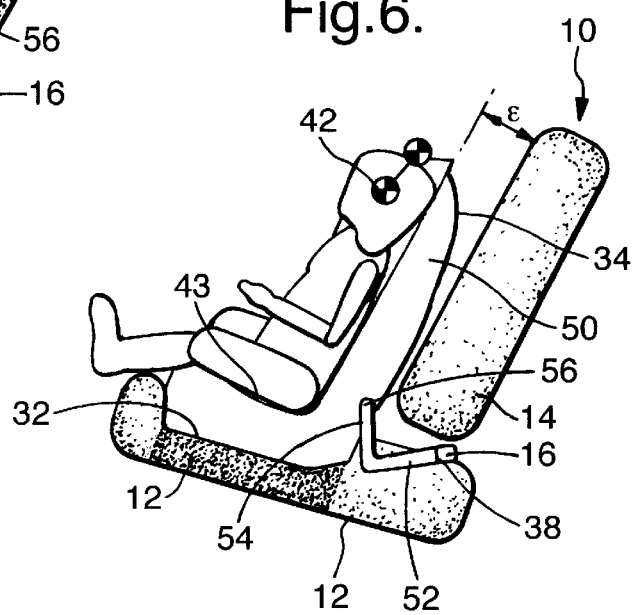

Under normal conditions, the link 52, 54 is retained in the orientation shown in FIG. 5 by a latch (not shown), such as ball catch which is designed to release when a load is applied. During the first phase of forward movement in the event of sudden deceleration, the link 52, 54 pivots in the counter-clockwise direction about the standard anchorage unit 16. The pivot joint 56 allows the base support surface 32 of the seat 50 to remain generally parallel to the vehicle seat cushion 12, compressing it substantially uniformly, as shown in FIG. 6. Consequently, the effective range of angular movement of the child seat 50 about the standard anchorage unit 16 is limited to ε, which is substantially less than β. The compression of such a large area of the vehicle seat cushion 12 provides a greater resistance against downward movement of the child seat 50, with the result that the front edge of the base support surface 32 is higher in FIG. 6 than in FIG. 3.

Figure 7:
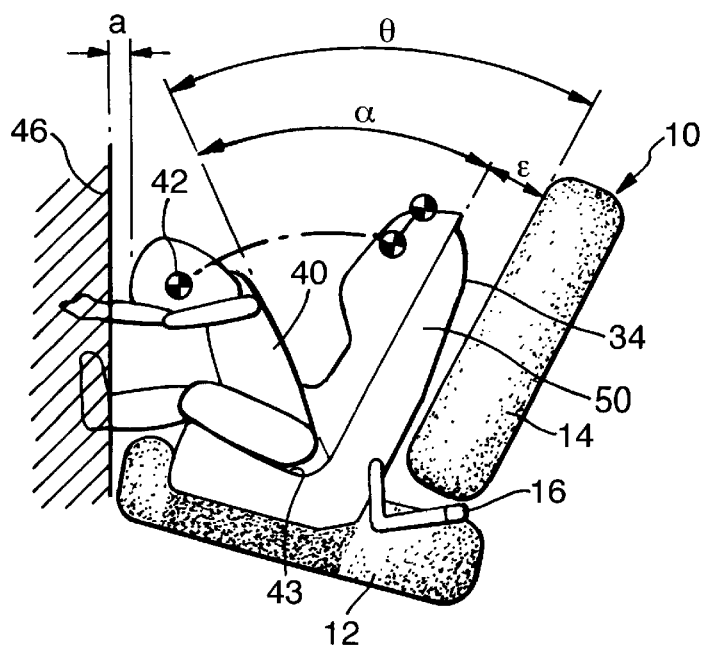

During the subsequent phase of movement, the torso of the dummy 40 pivots about its pelvis through the angle α, as before. The total angular movement θ of the dummy 40 is less than the angle δ, as shown in FIG. 7. Consequently, the total forward movement of the head of the dummy 40 is less, leaving a clearance a from the reference surface 46, as shown in FIG. 7.

The invention is applicable to seats for use in aircraft as well as to seats for use in land vehicles.

What is claimed is:

1. A child safety seat for use on a vehicle seat having a seat cushion and a seat back, the child safety seat comprising:
    a child seat structure having a seating surface for a child occupant, a base support surface for resting on said seat cushion, and a back support surface for abutting against said seat back, and
    a rigid link pivotally attached directly to the child seat structure so as to project from the child seat structure between the base support surface and the back support surface, wherein, when in use, attachment between the rigid link and the child seat structure is solely a pivot connection and a releasable connector mounted on the rigid link for engagement with a standard anchorage unit associated with the vehicle seat.

2. A child safety seat for use on a vehicle seat having a seat cushion and a seat back, the child safety seat comprising:
    a child seat structure having a seating surface for a child occupant, a base support surface for resting on said seat cushion, a back support surface for abutting against said seat back, and
    an L-shaped rigid link having a first limb carrying a releasable connector for engagement with a standard anchorage unit associated with the vehicle seat and a second limb having a free end pivotally attached to the child seat structure so as to project from the child seat structure between the base support surface and the back support surface.

3. A child safety seat according to claim 2, wherein the angle between the first and second limbs of the pivot link is such that the first limb lies in a rearward continuation of the plane of the base support surface and the second limb is generally parallel to the back support surface.

4. A child safety seat for use on a vehicle seat having a seat cushion and a seat back, the child safety seat comprising:
    a child seat structure having a seating surface for a child occupant, a base support surface for resting on said seat cushion, a back support surface for abutting against said seat back, and
    a rigid link pivotally attached to the child seat structure at a height above the base support surface of at least 30 mm so as to project from the child seat structure between the base support surface and the back support surface, and a releasable connector mounted on the rigid link for engagement with a standard anchorage unit associated with the vehicle seat.

5. A child safety seat for use on a vehicle seat having a seat cushion and a seat back, the child safety seat comprising:
    a child seat structure having a seating surface for a child occupant, a base support surface for resting on said seat cushion, a back support surface for abutting against said seat back, and
    a rigid link pivotally attached to the child seat structure at a pivot location above said seating surface so as to project from the child seat structure between the base support surface and the back support surface, and a releasable connector mounted on the rigid link for engagement with a standard anchorage unit associated with the vehicle seat.

6. A child safety seat according to claim 5, wherein the height of the pivot location above the base surface is at least 30 mm.

7. A child safety seat according to claim 5, wherein the rigid link is L-shaped with a first limb carrying the corresponding connector and a second limb having a free end pivotally attached to the child seat structure.

8. A child safety seat according to claim 7, wherein the angle between the first and second limbs of the pivot link is such that the first limb lies in a rearward continuation of the plane of the base support surface and the second limb is generally parallel to the back support surface.

* * * * *